(12) United States Patent
Kokeguchi

(10) Patent No.: US 7,516,979 B2
(45) Date of Patent: Apr. 14, 2009

(54) OCCUPANT RESTRAINT APPARATUS

(75) Inventor: Akira Kokeguchi, Tokyo (JP)

(73) Assignee: Takata Corporation, Tokyo (JP)

( * ) Notice: Subject to any disclaimer, the term of this patent is extended or adjusted under 35 U.S.C. 154(b) by 98 days.

(21) Appl. No.: 11/436,623

(22) Filed: May 19, 2006

(65) Prior Publication Data

US 2006/0290111 A1    Dec. 28, 2006

(30) Foreign Application Priority Data

Jun. 28, 2005    (JP)    ............................. 2005-188503

(51) Int. Cl.
*B60R 21/233* (2006.01)
*B60R 21/18* (2006.01)
(52) U.S. Cl. .................. 280/733; 280/729; 280/743.1
(58) Field of Classification Search .................. 280/733, 280/729, 743.1, 730.1
See application file for complete search history.

(56) References Cited

U.S. PATENT DOCUMENTS

| | | | | |
|---|---|---|---|---|
| 5,346,250 | A * | 9/1994 | Kamiyama ................... | 280/733 |
| 5,934,701 | A * | 8/1999 | Furukawa ................. | 280/730.1 |
| 6,059,311 | A * | 5/2000 | Wipasuramonton et al. . | 280/729 |
| 6,062,597 | A * | 5/2000 | Suyama ....................... | 280/733 |
| 6,109,647 | A   | 8/2000 | Akaba et al. | |
| 6,116,637 | A * | 9/2000 | Takeuchi et al. ............ | 280/733 |
| 6,142,512 | A * | 11/2000 | Suyama ....................... | 280/733 |
| 6,145,873 | A * | 11/2000 | Takeuchi ..................... | 280/733 |
| 6,220,626 | B1 * | 4/2001 | Utsumi et al. ................ | 280/733 |
| 6,237,946 | B1 * | 5/2001 | Nariyasu ..................... | 280/733 |
| 6,336,657 | B1 * | 1/2002 | Akaba et al. ................. | 280/733 |
| 6,419,264 | B1 * | 7/2002 | Tsuji et al. ................... | 280/733 |
| 6,499,763 | B1   | 12/2002 | Mishima | |
| 6,832,780 | B2 * | 12/2004 | Amamori .................. | 280/743.2 |
| 6,969,086 | B2 * | 11/2005 | Hasebe et al. ............ | 280/743.1 |
| 2003/0230883 | A1 * | 12/2003 | Heym ....................... | 280/743.1 |
| 2004/0145160 | A1 * | 7/2004 | Hasebe et al. ............... | 280/729 |
| 2004/0155439 | A1   | 8/2004 | Hasebe et al. | |

FOREIGN PATENT DOCUMENTS

| | | |
|---|---|---|
| JP | 11-180241 A | 7/1999 |
| JP | 2001-138863 A | 5/2001 |
| JP | 2001-163183 A | 6/2001 |

\* cited by examiner

*Primary Examiner*—John Q. Nguyen
*Assistant Examiner*—Joseph Rocca
(74) *Attorney, Agent, or Firm*—Foley & Lardner LLP

(57) ABSTRACT

An occupant restraint apparatus includes an airbag that inflates toward the front of an occupant and an inflatable seatbelt having at least an inflatable shoulder belt section. The shoulder belt is fastened on the front side of the occupant's upper body. The airbag includes a right airbag section and a left airbag section that inflate toward the right front and the left front, respectively, of the occupant. When the airbag and the shoulder belt section are both inflated and the airbag receives the occupant, the inflated shoulder belt section enters a hollow space provided between the ends of the right airbag section and the left airbag section. Thus, the apparatus prevents or suppresses discharge of gas from the airbag caused when the inflated shoulder belt section pushes the airbag inward before the airbag receives the occupant.

14 Claims, 5 Drawing Sheets

OCCUPANT RESTRAINT APPARATUS

BACKGROUND

The present invention relates to an occupant restraint apparatus including an airbag that inflates toward the front of an occupant and an inflatable seatbelt having at least an inflatable shoulder belt section.

Japanese Unexamined Patent Application Publication No. 11-170948 discloses an occupant restraint apparatus for restraining an occupant when a vehicle or the like collides. This apparatus includes an airbag that inflates toward the front of the occupant and an inflatable seatbelt (airbelt) having an inflatable shoulder belt section.

In the occupant restraint apparatus according to the above-mentioned publication, when the vehicle collides at a relatively low velocity, neither the airbag nor the airbelt is inflated and the airbelt functions simply as a seatbelt that restrains the occupant in the seat.

When the vehicle collides at a medium velocity, the shoulder belt section of the airbelt is inflated along the front side of the occupant's body so that the inflated shoulder belt section receives the occupant and absorbs the impact placed on the occupant. In this case, the airbag is not inflated.

When the vehicle collides at a relatively high velocity, the shoulder belt section is inflated along the front side of the occupant's body and the airbag is inflated toward the front of the occupant. The inflated shoulder belt section and the inflated airbag both receive the occupant and absorb the impact placed on the occupant.

SUMMARY

According to one embodiment of the invention, an occupant restraint apparatus includes an airbag that inflates toward the front of an occupant and an inflatable seatbelt having at least an inflatable shoulder belt section. When the airbag is in an inflated state, a surface of the airbag that faces the occupant has a region that faces the shoulder belt section and at least a portion of that region is recessed.

According to another embodiment of the invention, the airbag includes a left airbag section that inflates toward the left front of the occupant and a right airbag section that inflates toward the right front of the occupant, and the recessed portion is positioned between ends of the left airbag section and the right airbag section that are adjacent to the occupant when the airbag is in the inflated state.

It is to be understood that both the foregoing general description and the following detailed description are exemplary and explanatory only, and are not restrictive of the invention as claimed.

These and other features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

In the above-described occupant restraint apparatus according to Japanese Unexamined Patent Application Publication No. 11-170948, when the shoulder belt section of the airbelt and the airbag are both inflated, the inflated shoulder belt section is interposed between the occupant's body and the airbag. Therefore, the shoulder belt section pushes the airbag before the airbag receives the occupant, and accordingly, gas in the airbag is discharged from the airbag (gas is lost) through vent holes.

An object of the present invention is to provide an occupant restraint apparatus including an airbag that inflates toward the front of an occupant and an inflatable seatbelt having at least an inflatable shoulder belt section, the apparatus preventing or suppressing discharge of gas from the airbag caused when the inflated shoulder belt section pushes the airbag inward before the airbag receives the occupant.

In the occupant restraint apparatus according to the present invention, when the airbag is in the inflated state, a surface of the airbag that faces the occupant has a region that faces the shoulder belt section of the seatbelt and at least a portion of that region is recessed. Therefore, when the shoulder belt section and the airbag are both inflated and the airbag receives the occupant, at least a portion of the inflated shoulder belt section enters the recessed portion of the airbag. Accordingly, the occupant restraint apparatus prevents or suppresses discharge of gas from the airbag caused when the inflated shoulder belt section pushes the airbag inward before the airbag receives the occupant.

In the occupant restraint apparatus according to another embodiment, the airbag includes the left airbag section that inflates toward the left front of the occupant and the right airbag section that inflates toward the right front of the occupant. Accordingly, the inflated shoulder belt section enters a space between the ends of the left and right airbag sections that are adjacent to the occupant.

An embodiment of the present invention will be described below with reference to the drawings.

Figure 1:
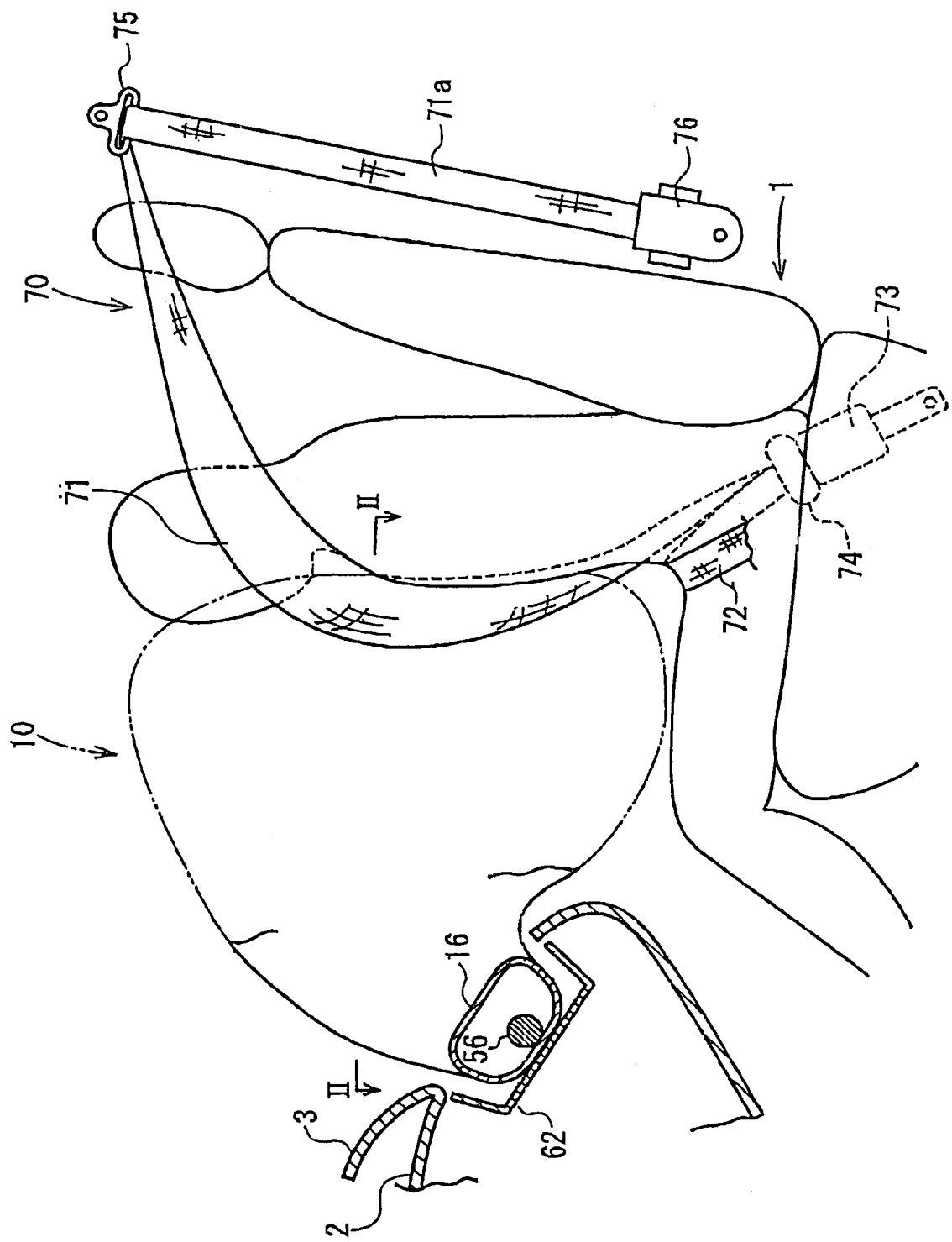
FIG. 1 is a side view of a vehicle cabin illustrating an occupant restraint apparatus according to one embodiment.
Figure 2:
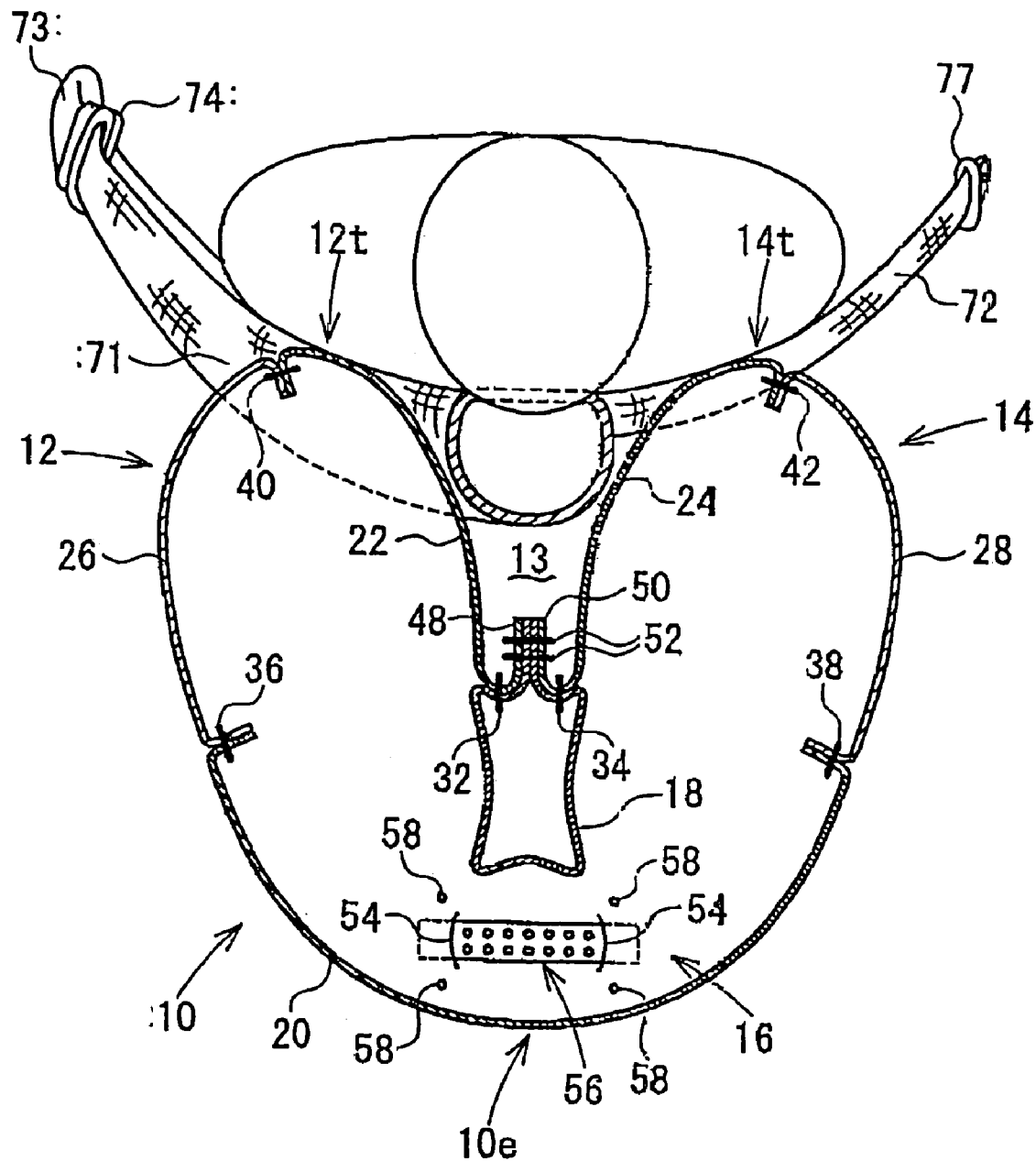
FIG. 2 is a sectional view of FIG. 1 taken along line II-II.
Figures 3A, 3B:
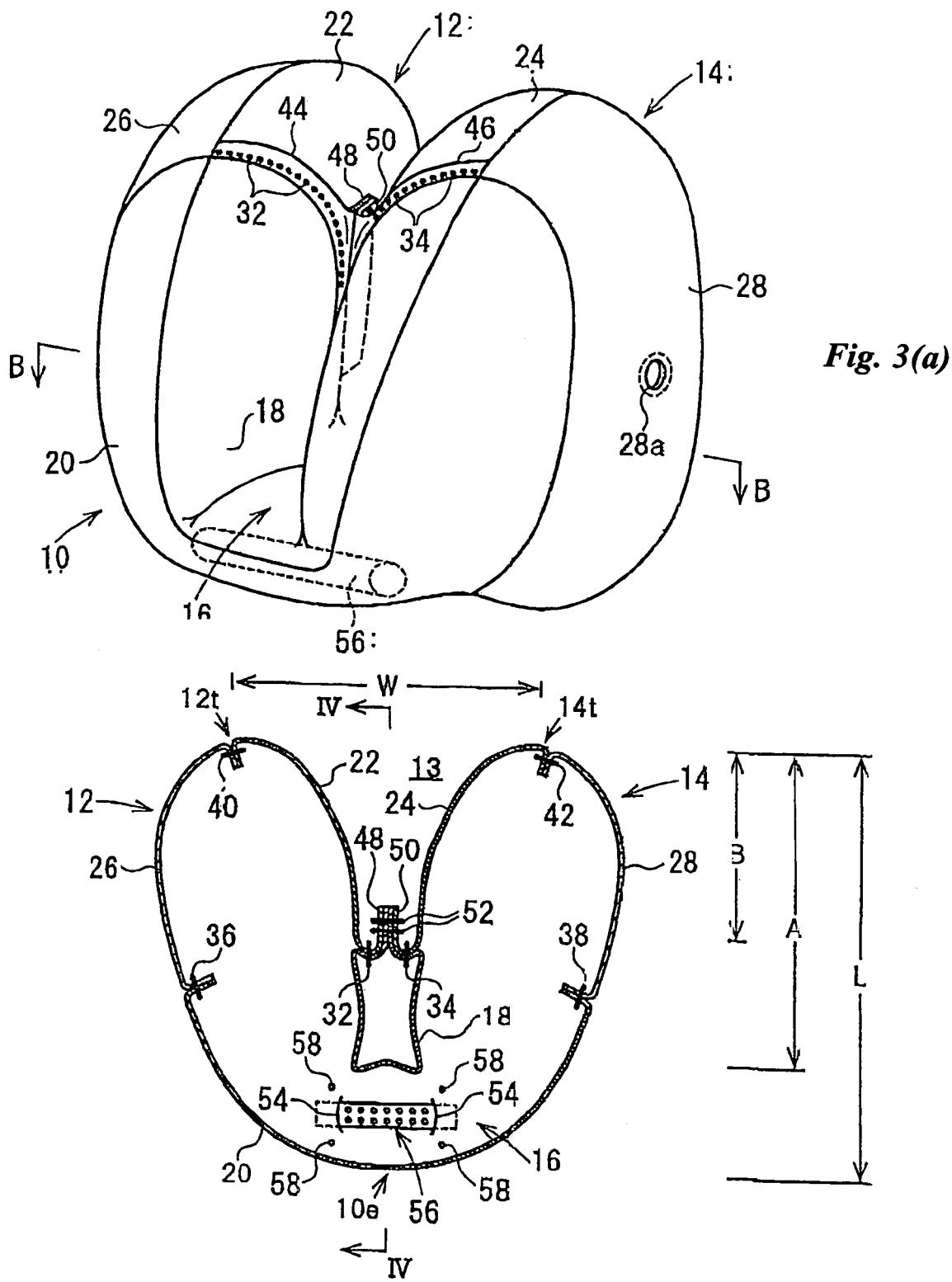
FIG. 3 shows a perspective view and a sectional view of an airbag included in the occupant restraint apparatus shown in FIG. 1.
Figure 4:
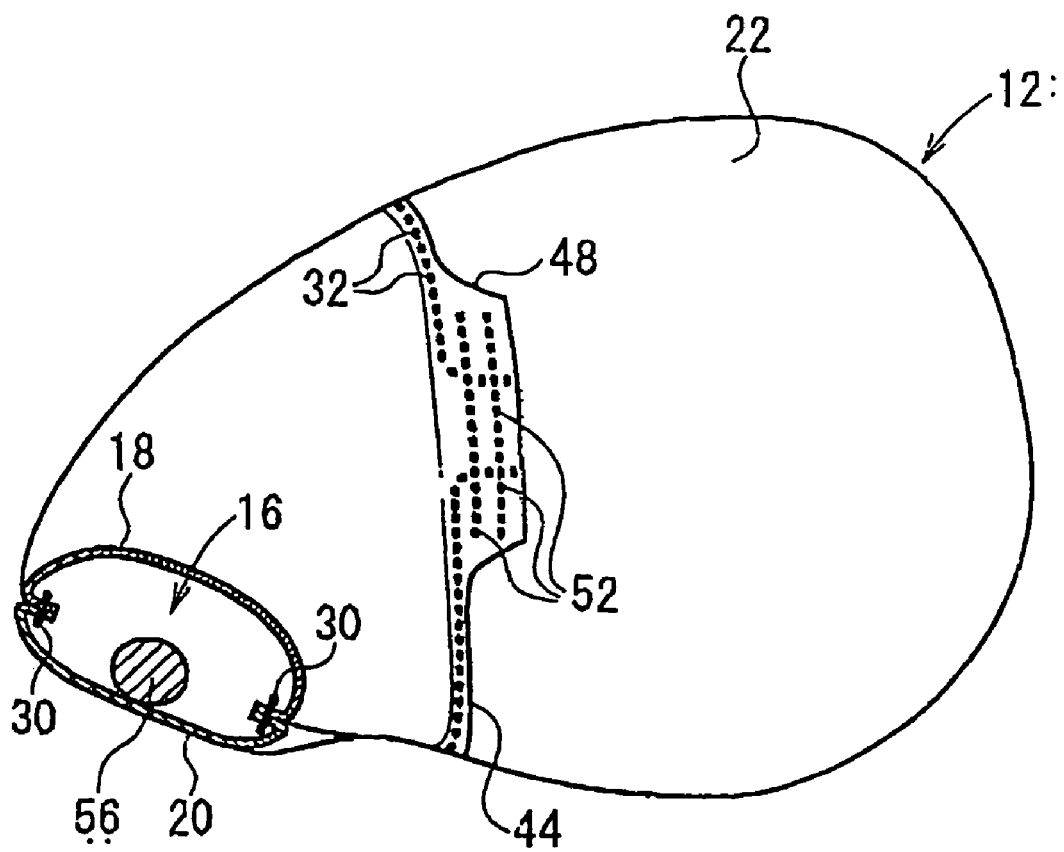
FIG. 4 is a sectional view of FIG. 3(b) taken along line IV-IV.
Figure 5A:
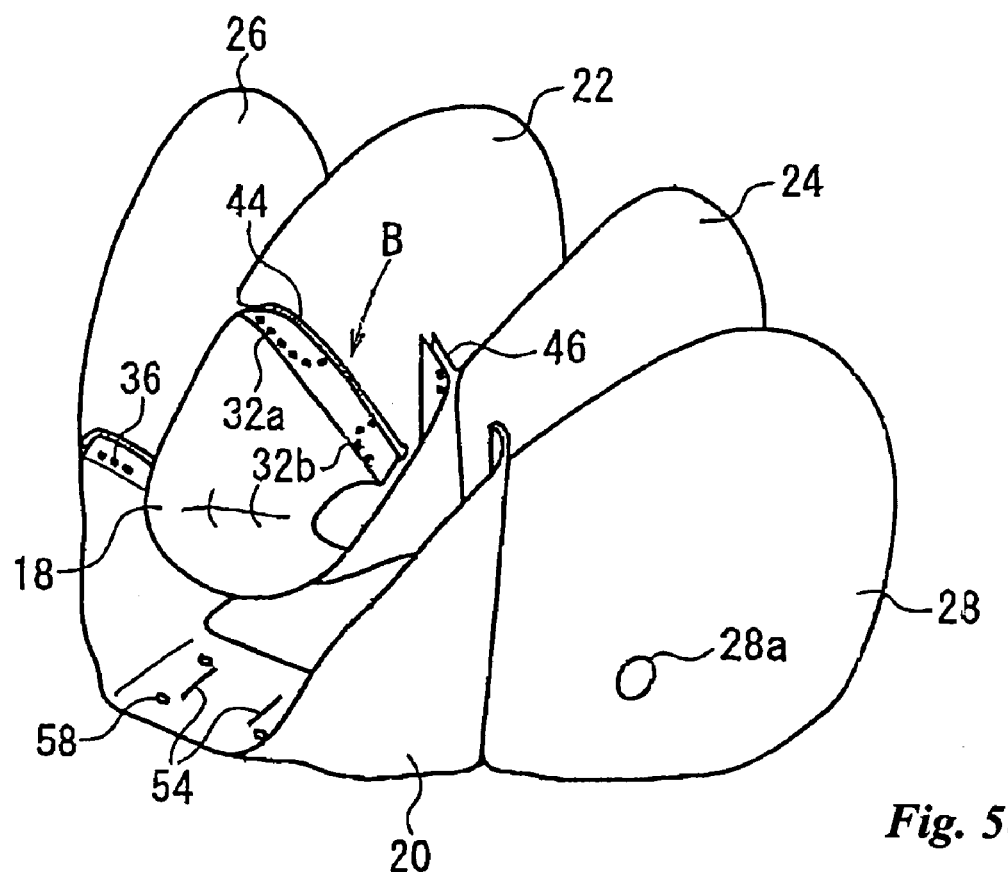
FIG. 5 shows an exploded perspective view of the airbag included in the occupant restraint apparatus shown in FIG. 1 and an enlarged view of a portion of the airbag.
Figure 5B:
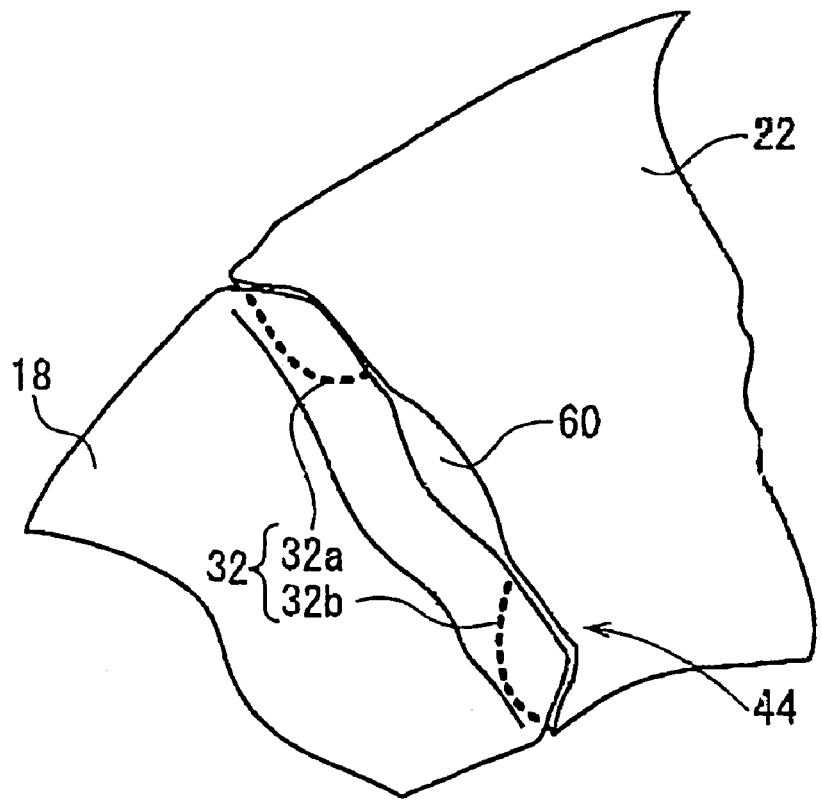

FIG. 1 is a side view of a vehicle cabin illustrating an occupant restraint apparatus according to one embodiment. FIG. 2 is a sectional view of FIG. 1 taken along line II-II. FIG. 3(a) is a perspective view of an airbag included in the occupant restraint apparatus, and FIG. 3(b) is a sectional view of FIG. 3(a) taken along line B-B. FIG. 4 is a sectional view of FIG. 3(b) taken along line IV-IV. FIG. 5(a) is an exploded perspective view of the airbag, and FIG. 5(b) is an enlarged view of a portion denoted by B in FIG. 5(a).

According to one embodiment, the occupant restraint apparatus serves as an occupant restraint apparatus for a passenger seat of an automobile. The occupant restraint apparatus includes an airbag 10 that inflates toward the front of a passenger seat 1 and an airbelt 70 that functions as an inflatable seatbelt.

According to one embodiment, the airbelt 70 includes an inflatable shoulder belt section 71 that extends diagonally (from the upper left to the lower right in this embodiment) along the front side of the upper body of an occupant sitting in the passenger seat 1, a webbing 71*a* connected to the shoulder belt section 71, a lap belt section 72 that extends around the waist of the occupant in the left-right direction, a buckle device 73 disposed adjacent to the passenger seat 1 (on the right in this embodiment), a tongue 74 that is inserted into the buckle device 73 to be engaged therewith when the airbelt 70 is fastened, and a through anchor 75 or the like that guides the webbing 71*a*.

The webbing 71*a* is a normal belt similar to a commonly known uninflatable seatbelt, and is slidably guided by the through anchor 75. One end of the webbing 71*a* is connected to an emergency locking seatbelt retractor (ELR) 76 and fixed to the vehicle body such that the webbing 71*a* can be retracted.

One end of the shoulder belt section 71 is connected to the webbing 71*a* by sewing or the like, and the other end of the shoulder belt section 71 is connected to the tongue 74.

According to one embodiment, the lap belt section 72 is a normal belt similar to a commonly known uninflatable seatbelt. One end of the lap belt section 72 is connected to the tongue 74, and the other end of the lap belt section 72 is connected to a seatbelt retractor (ELR) 77 that is disposed at a position opposite to the buckle device 73 across the passenger seat 1.

In this embodiment, an inflator for the airbelt (not shown) that generates high-pressure gas in case of emergency, for example, when the vehicle collides or the like, is connected to the buckle device 73. The tongue 74 has a passage for guiding the gas from the inflator to the shoulder belt section 71.

The shoulder belt section 71 is obtained by folding a wide, band-shaped bag into a thin strip shape and covering the folded bag with a cover. The strip shape of the shoulder belt section 71 is maintained under normal conditions. The airbelt 70 is used similarly to a normal seatbelt. When, for example, the vehicle collides or the like and the airbelt inflator is activated, the gas is injected into the shoulder belt section 71 (bag) through the above-mentioned passage and the shoulder belt section 71 is inflated along the front side of the upper body of the occupant so as to increase the thickness and width (diameter) thereof, as shown in the figure.

According to this embodiment, the airbag 10 includes a right airbag section 12 that inflates toward the right front of the occupant, a left airbag section 14 that inflates toward the left front of the occupant, and a communicating section 16 through which the right airbag section 12 and the left airbag section 14 communicate with each other at one end thereof. The communicating section 16 defines a base end of the airbag 10.

When the airbag 10 is in the inflated state, the right airbag section 12 and the left airbag section 14 are not connected to each other with a link member, such as a tie panel or the like, at ends thereof. Accordingly, a hollow space 13 is provided between the ends of the airbag sections 12 and 14. The hollow space 13 is open toward the occupant (that is, upward in FIGS. 2 and 3(*b*)).

When the airbag 10 is completely inflated, the distance W between an utmost end 12*t* of the right airbag section 12 and an utmost end 14*t* of the left airbag section 14 is preferably in the range of 150 mm to 450 mm, more preferably, 170 mm to 430 mm. In addition, the horizontal distance A from the utmost ends 12*t* and 14*t* to the deepest portion of the hollow space 13 is preferably in the range of 280 mm to 480 mm, more preferably, 310 mm to 450 mm.

In this airbag 10, the right airbag section 12 and the left airbag section 14 are connected to each other by a seam 52 at middle portions thereof in the inflating direction. The horizontal distance B from the utmost ends 12*t* and 14*t* to the seam 52 is preferably in the range of 50 mm to 300 mm, more preferably, 90 mm to 260 mm.

In this embodiment, the airbag 10 is formed by sewing panels 18, 20, 22, 24, 26, and 28 together. The panels 26 and 28 have vent holes 26*a* and 28*a*, respectively (vent hole 26*a* is not shown). As shown in FIG. 3(*a*), these vent holes 26*a* and 28*a* are formed in outwardly facing surfaces of the bags 12 and 14. Although the vent hole 26*a* in the panel 26 is not shown in the figure as mentioned above, the vent hole 26*a* is provided at a position symmetric to the vent hole 28*a*.

Next, the structure in which the panels are sewn together will be described below.

As shown in FIG. 5(*a*), the panel 18 (rear inner panel) defines inner surfaces of the right airbag section 12 and the left airbag section 14 in a region behind the middle portions thereof in the inflating direction and an inner surface of the communicating section 16. The panel 20 (rear outer panel) defines a surface opposite to the rear inner panel 18 (outwardly facing surface of the airbag).

The panels 22 and 24 (front inner panels) define inner surfaces of the right airbag section 12 and the left airbag section 14 in a region in front of the middle portions thereof in the inflating direction (that is, surfaces of the right airbag section 12 and the left airbag section 14 that face each other).

The panels 26 and 28 (front outer panels) define surfaces opposite to the front inner panels 22 and 24, respectively (outwardly facing surfaces of the airbag).

Reference numeral 30 denotes a seam (sewing thread) that connects the rear inner panel 18 and the rear outer panel 20 to each other. Reference numerals 32 and 34 denote seams that connects the rear inner panel 18 to the front inner panels 22 and 24, respectively. Reference numerals 36 and 38 denote seams that connect the rear outer panel 20 to the front outer panels 26 and 28, respectively.

Reference numeral 28*a* denotes the vent hole formed in the front outer panel 28 of the left airbag section 14. Although not shown in the figure, the front outer panel 26 also has a similar vent hole in the right airbag section 12.

As shown in FIG. 3(*a*), a seam margin (connection margin) 44 between the rear inner panel 18 and the front inner panel 22 and a seam margin (connection margin) 46 between the rear inner panel 18 and the front inner panel 24 are disposed such that the seam margins 44 and 46 are exposed on the exterior of the right airbag section 12 and left airbag section 14, respectively, of the airbag product. As shown in FIGS. 3 and 4, tongue-shaped connecting tabs 48 and 50 (only the connecting tab 48 is shown in FIG. 4) project from the seam margins 44 an 46, respectively. As shown in FIG. 3(*b*), the connecting tabs 48 and 50 are connected to each other by a seam 52.

As described above, the inner surfaces of the right airbag section 12 and the left airbag section 14 are connected to each other at the middle portions thereof in the inflating direction by combining the seam margin 44 between the rear inner panel 18 and the front inner panel 22 and the seam margin 46 between the rear inner panel 18 and the front inner panel 24 together.

The distance between the back end 10*e* of the airbag in the inflated state and the seam 52 is preferably in the range of 30% to 70%, more preferably, 40% to 55%, of the length L of the inflated airbag in the front-rear direction.

The rear outer panel 20 that defines the outer surface of the communicating section 16 has a pair of slits 54 and 54 through which the inflator is inserted. According to one embodiment, as shown in FIGS. 3(*a*) and 3(*b*), a rod-shaped inflator 56 is used. The rod-shaped inflator 56 is inserted through the slits 54 and 54 so as to extend through the communicating section 16 in the width direction of the vehicle, and both ends of the inflator 56 are disposed outside the airbag 10.

The airbag 10 is manufactured by the steps described below. First, as shown in FIG. 5(*a*), the rear inner panel 18 is sewn to the front inner panels 22 and 24 with the seams 32 and 34, respectively, and the rear outer panel 20 is sewn to the front outer panels 26 and 28 with the seams 36 and 38, respectively. At this time, the seam margin 44 between the rear inner panel 18 and the front inner panel 22 and the seam margin 46 between the rear inner panel 18 and the front inner panel 24 are exposed on the exterior of the airbag in the airbag product.

In this embodiment, as shown in FIG. 5(*b*), the rear inner panel 18 and the front inner panel 22 are sewn to each other with seams 32 (32*a* and 32*b*) such that the rear inner panel 18 and the front inner panel 22 are connected to each other only at the ends of the seam margin 44. Accordingly, an opening 60 for reversing the airbag is formed between the seams 32*a* and 32*b*.

Next, the panel unit obtained by sewing the rear inner panel 18 and the front inner panels 22 and 24 together is placed on the panel unit obtained by sewing the rear outer panel 20 and the front outer panels 26 and 28 together such that the surfaces that are to face outward when the airbag is completed as the airbag product face each other. Then, the panel units are sewn together by the seams 30, 40, and 42. Accordingly, an intermediate body of the airbag that is in the reversed state is obtained.

Then, the thus obtained intermediate body of the airbag is reversed using the opening 60 formed in the seam margin 44. Then, the connecting tabs 48 and 50 of the seam margins 44 and 46, respectively, are sewn together by the seam 52. Accordingly, the airbag product 10 is completed.

When the connecting tabs 48 and 50 is sewn together, the opening 60 is closed by the seam 52. The airbag 10 is folded and stored in a case 62, and is installed behind an instrument panel 2 disposed in front of the passenger seat of the automobile. Referring to FIG. 3(*b*), reference numeral 58 denotes holes through which fixing parts (not shown), such as bolts or the like, are inserted to attach the airbag 10 to the case 62. The inflator 56 are also attached to the case 62 at both ends thereof.

In this embodiment, the instrument panel 2 has a portion 3 that covers the case 62 and functions as a lid (this portion is hereafter simply called a lid), and the case 62 is disposed behind this lid 3. When the airbag 10 inflates, the lid 3 opens by being pushed by the airbag 10 so that the airbag 10 can deploy into the vehicle cabin, that is, toward the front of the occupant of the passenger seat.

Next, the operation of the occupant restraint apparatus including the above-described airbag 10 and the airbelt 70 will be described below. Similar to the above-described occupant restraint apparatus according to Japanese Unexamined Patent Application Publication No. 11-170948, the occupant restraint apparatus according to this embodiment is controlled on the basis of the collision velocity of the vehicle.

More specifically, in this embodiment, when the vehicle collides at a relatively low velocity, neither the inflator for airbelt nor the inflator 56 for airbag is activated. Accordingly, the airbelt 70 functions simply as a seatbelt that restrains the occupant in the passenger seat 1.

When the vehicle collides at a medium velocity, the inflator for airbelt is activated. Accordingly, the shoulder belt section 71 of the airbelt 70 is inflated along the front side of the occupant's body so that the inflated shoulder belt section 71 absorbs the impact placed on the occupant. In this case, the inflator 56 for airbag is not activated.

When the vehicle collides at a relatively high velocity, the inflator for airbelt and the inflator 56 for airbag are both activated. Accordingly, the shoulder belt section 71 is inflated along the front side of the occupant's body and the right airbag section 12 and the left airbag section 14 are inflated toward the right front and the left front, respectively, of the occupant.

In this occupant restraint apparatus, the hollow space 13, which is open toward the occupant, is formed between the utmost ends 12*t* and 14*t* of the inflated right airbag section 12 and the inflated left airbag section 14, respectively, that are adjacent to the occupant. Therefore, as shown in FIG. 2, when the occupant is received by the airbag 10, the right airbag section 12 receives the right chest of the occupant, the left airbag section 14 receives the left chest of the occupant, and at least a portion of the shoulder belt section 71, which inflates along the front side of the occupant's body, enters the hollow space 13. Accordingly, when the airbag 10 receives the occupant, the inflated shoulder belt section 71 does not push the airbag 10 inward, and discharge of gas from the airbag 10 is prevented or suppressed.

When the right airbag section 12 and the left airbag section 14 receive the occupant, gas is discharged from the respective vent holes 26*a* and 28*a* so that the impact placed on the occupant is absorbed. At this time, a region around the sternum of the occupant faces the hollow space 13 and a portion of the shoulder belt section 71 that is placed in the region around the sternum enters the hollow space 13. Accordingly, the reaction force applied to the occupant in the region around the sternum upon colliding with the airbag is reduced.

In this embodiment, the right airbag section 12 and the left airbag section 14 are connected to each other. Therefore, even if one of the right airbag section 12 and the left airbag section 14 is inflated quicker than the other when the right airbag section 12 and the left airbag section 14 are inflated from the folded state, the airbag section that is inflated first pulls the other airbag section that is inflated slowly and accelerates the inflation thereof.

In addition, since the right airbag section 12 and the left airbag section 14 are connected to each other at the middle portions thereof in the inflating direction, one of the airbag sections that is inflated first starts to pull the other airbag that is inflated slowly in a relatively early stage of inflation. Therefore, the right airbag section 12 and the left airbag section 14 are evenly and smoothly inflated from the early stage of inflation.

Although the above-described embodiment shows an example of the present invention, the present invention is not limited to the structure shown in the figures. For example, in the above-described embodiment, the airbag 10 includes the right airbag section 12 that inflates toward the right front of the occupant and the left airbag section 14 that inflates toward the left front of the occupant, and the inflated shoulder belt section 71 of the airbelt 70 is received by the space between these airbag sections 12 and 14. However, the airbag may also be formed of a single airbag section. In such a case, when the airbag is in the inflated state, a surface of the airbag that faces the occupant has a region that faces the shoulder belt section 71 of the airbelt 70 and at least a portion of that region is recessed in a direction away from the occupant.

Although the occupant restraint apparatus is controlled on the basis of the collision velocity of the vehicle according to the above-described embodiment, the present invention is not limited to this. The occupant restraint apparatus may also be controlled on the basis of factors other than the collision velocity of the vehicle, for example, the weight and the seating position or the like of the occupant.

Although only the shoulder belt section 71 is inflatable in the airbelt 70 according to the above-described embodiment, the airbelt 70 may also be structured such that the lap belt section 72 is also inflatable. In addition, systems for supplying gas to the airbelt and retracting the airbelt when the airbelt is not used and structures in which the airbelt is attached to the tongue and the through anchor may also be modified from those shown in the figures.

Although the present invention is applied to an occupant restraint apparatus for a passenger seat of an automobile according to the above-described embodiment, the present invention may also be applied to occupant restraint apparatuses for seats other than the passenger seat in the automobile or to occupant restraint apparatuses for movable bodies other than automobiles (vehicles).

Priority Application 2005-188503, filed Jun. 28, 2005 including the specification, drawings, claims and abstract, is incorporated herein by reference in its entirety.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. An occupant restraint apparatus comprising an airbag that inflates toward the front of an occupant and an inflatable seatbelt having at least an inflatable shoulder belt section;
   wherein, when the airbag is configured so that when the airbag is in an inflated state, a surface of the airbag that faces the occupant has a region that faces the shoulder belt section and at least a portion of said region is recessed so that at least a portion of the inflated shoulder belt section enters the recessed portion of said airbag to form a hollow space in the recess, wherein the hollow space is bounded by the inflated shoulder belt section and the surface of the airbag.

2. An occupant restraint apparatus according to claim 1, wherein the airbag includes a left airbag section that inflates toward the left front of the occupant and a right airbag section that inflates toward the right front of the occupant, and the recessed portion is positioned between ends of the left airbag section and the right airbag section that are adjacent to the occupant when the airbag is in the inflated state.

3. An occupant restraint apparatus according to claim 2, wherein when the airbag is inflated, the distance between an utmost end of the right airbag section and an utmost end of the left airbag section is in the range of 150 mm to 450 mm.

4. An occupant restraint apparatus according to claim 2, wherein the airbag includes a communicating section through which the right airbag section and the left airbag section communicate with each other and defines a base end of the airbag.

5. An occupant restraint apparatus according to claim 4, wherein a rod-shaped inflator extends through the communicating section, wherein two ends of the inflator are disposed outside the airbag.

6. An occupant restraint apparatus according to claim 1, wherein the inflatable seatbelt further comprises an inflator configured to generate high pressure gas.

7. An occupant restraint apparatus according to claim 1, wherein the inflatable seatbelt further comprises an inflatable lap belt section.

8. An occupant restraint apparatus for a vehicle, comprising an airbag that inflates toward the front of an occupant and an inflatable seatbelt having at least an inflatable shoulder belt section;
   wherein, when the airbag is configured so that when the airbag is in an inflated state, a surface of the airbag that faces the occupant has a region that faces the shoulder belt section and at least a portion of said region is recessed so that at least a portion of the inflated shoulder belt section enters the recessed portion of said airbag to form a hollow space in the recess, wherein the hollow space is bounded by the inflated shoulder belt section and the surface of the airbag.

9. An occupant restraint apparatus according to claim 8, wherein the airbag includes a left airbag section that inflates toward the left front of the occupant and a right airbag section that inflates toward the right front of the occupant, and the recessed portion is positioned between ends of the left airbag section and the right airbag section that are adjacent to the occupant when the airbag is in the inflated state.

10. An occupant restraint apparatus according to claim 9, wherein when the airbag is inflated, a hollow space, open towards the occupant, is formed between the right airbag section and the left airbag section;
   wherein the right airbag section receives a right chest of the occupant, the left airbag section receives a left chest of the occupant and at least a portion of the inflatable shoulder belt section enters the hollow space.

11. An occupant restraint apparatus according to claim 8, wherein the inflatable seatbelt further comprises an inflatable lap belt section.

12. An occupant restraint apparatus according to claim 8, wherein when the vehicle collides at a first velocity, neither an inflator for the inflatable seatbelt nor an inflator for the airbag is activated.

13. An occupant restraint apparatus according to claim 8, wherein when the vehicle collides at a second velocity, an inflator for the inflatable seatbelt is activated and an inflator for the airbag is not activated.

14. An occupant restraint apparatus according to claim 8, wherein when the vehicle collides at a third velocity, an inflator for the inflatable seatbelt is activated and an inflator for the airbag is activated.

* * * * *